(12) United States Patent
Cheung

(10) Patent No.: US 10,390,226 B1
(45) Date of Patent: Aug. 20, 2019

(54) MOBILE IDENTIFICATION METHOD BASED ON SIM CARD AND DEVICE-RELATED PARAMETERS

(71) Applicant: Benefit Vantage Limited, Shau Kei Wan (HK)

(72) Inventor: Harry Lup Sun Cheung, Shau Kei Wan (HK)

(73) Assignee: Benefit Vantage Limited, Shau Kei Wan (HK)

( * ) Notice: Subject to any disclaimer, the term of this patent is extended or adjusted under 35 U.S.C. 154(b) by 0 days.

(21) Appl. No.: 15/928,348

(22) Filed: Mar. 22, 2018

(30) Foreign Application Priority Data

Mar. 8, 2018 (GB) .................................. 1803719.2

(51) Int. Cl.
| | |
|---|---|
| *H04W 12/06* | (2009.01) |
| *H04W 8/20* | (2009.01) |
| *H04L 29/06* | (2006.01) |
| *H04W 12/08* | (2009.01) |
| *H04L 29/12* | (2006.01) |
| *H04W 48/02* | (2009.01) |
| *H04W 48/14* | (2009.01) |

(52) U.S. Cl.
CPC .......... *H04W 12/06* (2013.01); *H04L 61/106* (2013.01); *H04L 63/0853* (2013.01); *H04L 63/0892* (2013.01); *H04W 8/20* (2013.01); *H04W 12/08* (2013.01); *H04W 48/02* (2013.01); *H04W 48/14* (2013.01)

(58) Field of Classification Search
CPC ..... H04W 68/02; H04W 68/08; H04W 68/12; H04W 68/04; H04W 68/06; H04W 68/00; H04W 68/005; H04W 72/0446; H04W 72/04; H04W 80/04; H04W 84/02; H04W 84/027; H04W 88/00; H04W 88/02; H04W 88/08; H04W 76/00; H04W 76/10; H04W 76/16; H04W 76/28; H04W 48/08; H04W 48/04; H04W 48/16; H04W 12/08; H04W 12/06; H04W 48/02; H04W 12/004; H04W 12/00; H04W 12/0013; H04W 12/0017; H04W 4/02; H04W 8/04; H04W 12/00405; H04W 12/00409; H04W 12/005; H04W 12/00514; H04W 12/0602; H04W 48/00; H04W 48/14; H04W 8/20; H04L 63/0892; H04L 29/06755; H04L 29/06782; H04L 29/12; H04L 29/06; H04L 29/12518; H04L 63/105

See application file for complete search history.

(56) References Cited

U.S. PATENT DOCUMENTS

| | | | |
|---|---|---|---|
| 2005/0039050 A1* | 2/2005 | Morand et al. ................ | 713/201 |
| 2007/0174904 A1* | 7/2007 | Park .................................. | 726/7 |
| 2007/0180503 A1* | 8/2007 | Li et al. ............................ | 726/5 |
| 2008/0184349 A1* | 7/2008 | Ting ................................. | 726/7 |

(Continued)

*Primary Examiner* — Meless N Zewdu
(74) *Attorney, Agent, or Firm* — Maier & Maier, PLLC

(57) ABSTRACT

A new method of mobile user identification by third parties based on the SIM card and device-related parameters available in telecommunication network. Applicable to a wide scope of different industry segments: Fintech companies, digital merchants, e-government solutions and enterprises, provides enhanced platform security features and improved end users experience and transaction processing in interactions with those platforms.

8 Claims, 5 Drawing Sheets

(56) References Cited

U.S. PATENT DOCUMENTS

| | | | |
|---|---|---|---|
| 2012/0256725 A1* | 10/2012 | Hayashi | 340/5.81 |
| 2013/0067552 A1* | 3/2013 | Hawkes et al. | 726/7 |
| 2016/0087957 A1* | 3/2016 | Shah et al. | H04L 63/08 |
| 2016/0226848 A1* | 8/2016 | Yuan et al. | H04L 63/102 |

* cited by examiner

MOBILE IDENTIFICATION METHOD BASED ON SIM CARD AND DEVICE-RELATED PARAMETERS

FIELD

The present invention relates to a new method of mobile user identification by third parties based on the SIM card and device-related parameters available in telecommunication network. The invention is particularly, but not exclusively, applicable to a wide scope of different industry segments: Fintech companies, digital merchants, e-government solutions, enterprises, etc. and provides enhanced platform security features and improved end users experience and transaction processing in interactions with those platforms.

BACKGROUND

In today's rapidly increasing mobile-based ecosystem, a wide number of digital merchants are looking for the best way to adopt "Mobile First" or "Mobile Only" strategy. New generations of users are spending most of their time on-the-go expecting to have a seamless user experience across their mobile access channels. The increased number of different mobile applications installed on user's devices, higher online usage and mobile-based transactions as well as the growing security issues are challenging traditional username (email)-password login and verification models. Looking at those challenges digital merchants, payment providers, online enterprises and application developers are fully recognizing the need for users' security transformations in terms of identity, authentication and authorization methods, considering that changes shouldn't compromise the prominent level of user service/application experience in terms of simplicity, seamlessness and convenience.

Mobile phone number (Mobile Station International Subscriber Directory Number or MSISDN) is at present the most widely used unique user identifier. Having that in mind, the present invention has recognized Mobile Operators (i.e. the owners of users' SIM card information) as one of the most important players in providing the future of digital mobile identification options. By leveraging closely on the Mobile Operators' network components, the invention aims to simplify mobile identification and authentication process, thus increasing the level of security in digital ecosystem along with providing more efficient business operations for both mobile application developers and website owners.

SUMMARY

The aim of the present solution is to overcome the above-mentioned problems, associated with the use of known methods of identifying mobile users for the purposes of authorised access to applications or websites.

Therefore, the object of the invention is a method of a mobile user identification based on SIM card and device-related parameters available in telecommunication network, comprising the following steps:
  once the mobile user is trying to interact with an application or to access a website, the application/website developer transmits a Mobile ID request to an external IPification server;
  the IPification server transmits up to six Mobile ID queries in form of Application Programming Interface (API) calls to a Mobile Operator server, whereby each Mobile ID query is based on one of the following SIM card/device-related input parameters:
    IMSI (International Mobile Subscriber Identity),
    ICCID (Integrated Circuit Card Identifier)
    IMEI (International Mobile Equipment Identity),
    MSISDN (Mobile Station International Subscriber Directory Number),
    Private IP (IP address used by Mobile Operator to internally identify the user in its network), and
    Public IP: Port (IP address and port used by Mobile Subscribers externally, i.e. when accessing public domain, Internet);
  the Mobile Operator server transmits Mobile IDs back to the IPification server, whereby each of the Mobile IDs is generated in response to one of the Mobile ID queries sent to Mobile Operator server as input parameters, and whereby each Mobile ID is a unique alphanumeric identifier of the user being a subscriber of the mobile communication services provided by the Mobile Operator;
  the IPification server verifies whether all the Mobile IDs obtained from the Mobile Operator server are identical, and depending on the verification result reacts in two alternative ways:
    if the verification result is positive, the IPification server provides the user's single Mobile ID to the application/website developer thereby authenticating the mobile user and thus allowing him to interact with the application or access the website;
    if the verification result is negative, the IPification server provides the application/website developer with the information about unsuccessful authentication of the user, and as a result the user is not allowed to interact with the application or access the website.

There are several different options (combinations of six different parameters listed above) used by the present invention to identify the current application/website user based on his/her SIM card/device information. Specific combination being used largely depends on the network access channel (cellular, Wi-Fi) as well as the application type (Android, iOS, mobile web). These six parameters are used once the user is accessing an application for the first time and during each consecutive time.

The method according to the present invention uses cloud service in form of the IPification server arranged between application/website developers and global network of Mobile Operators providing queries for up to six SIM card and device-related parameters. In a preferred embodiment, the communication between the IPification server and the Mobile Operator server uses at least one of the following security mechanisms: SSL/HTTPS, WSS-SOAP, VPN and PKI, thus providing the highest level of data transfer security.

The method according to the invention involves a step of sending Mobile ID queries toward Mobile Operator server with above-mentioned specific parameters included as inputs, expecting to receive response with Mobile ID (unique user identifier) corresponding to these specific parameters. In certain countries some of the Mobile Operators are using MSISDN as Mobile ID. In these cases, the present method involves the use of hashing algorithm to mask the real MSISDN and alphanumeric reference which will be unique for that specific mobile user (being a subscriber of the mobile communication services provided by the Mobile Operator) to further enhance the user privacy objectives while ensuring the authenticity of the mobile user.

The integration with the Mobile Operator servers is comprised of several different Application Programming Interfaces (APIs) thus enabling up to six factors of authentication for application/website providers (e.g. digital merchants) depending on their specific needs. All the APIs required are part of standard Mobile Operator network components and are already a part of their existing infrastructure. Accordingly, in another preferred embodiment of the invention the Mobile Operator network components being used include:

HLR (Home Location Register);
GGSN/P-GW (Gateway GPRS Support Node/Packet Data Network Gateway);
CGN (Carrier-grade NAT).

GGSN and CGN components are being used to resolve Private IP address and combination of Public IP address and Port into Mobile ID, while HLR is being used to resolve IMSI, ICCID, IMEI and MSISDN into Mobile ID.

As mentioned above, when the method according to the invention is performed, the IPification server sends up to six parameters to the Mobile Operator server as input parameters (Mobile ID queries) for a single user verification, expecting to receive same value of Mobile ID in response to each of the parameters, thus enabling the specific user identity confirmation beyond any doubt. Up to six server-to-server Application Programming Interfaces (APIs Integrations) are provided in between the IPification server and the Mobile Operator server. These include:

PUBLIC IP: PORT to MOBILE ID (MSISDN) API (GGSN & CGN)
PRIVATE IP to MOBILE ID (MSISDN) API (GGSN)
IMSI to MOBILE ID (MSISDN) API (HLR)
IMEI to MOBILE ID (MSISDN) API (HLR/EIR)
ICCID to MOBILE (MSISDN) API (HLR)
MSISDN to MOBILE ID API

The APIs listed above are used within the Mobile Operator network to resolve input parameters into unique Mobile ID.

Based on the results from up to six different Mobile ID queries in form of API calls (also called API requests), the present invention can undoubtedly process successful authentication process, successfully authenticate the mobile user or inform related party (i.e. application/website developer) about unsuccessful authentication.

Depending on specific needs the method according to the invention can provide up to six factor authentications, providing possibility to match up to six Mobile IDs received on the Mobile Operator side, as results of six different API calls. If required number of Mobile IDs is matched, the present invention can undoubtedly authenticate specific device/SIM card and thus confirm the successful user identification. In case some of the required Mobile IDs are not matched (Mobile ID correspond to a different Device/SIM card or Mobile ID is not resolved at all), the present invention can undoubtedly confirm the inability to authenticate specific device/SIM card and thus confirm the unsuccessful identification of the user. Based on the mobile user identification results using present invention, the application/website developers can better adjust their end user experience and customize further interactions with their platforms.

BRIEF DESCRIPTION OF THE DRAWINGS

The invention will now be further illustrated in the preferred examples, with reference to the accompanying drawings, in which.

DETAILED DESCRIPTION

Figure 1:
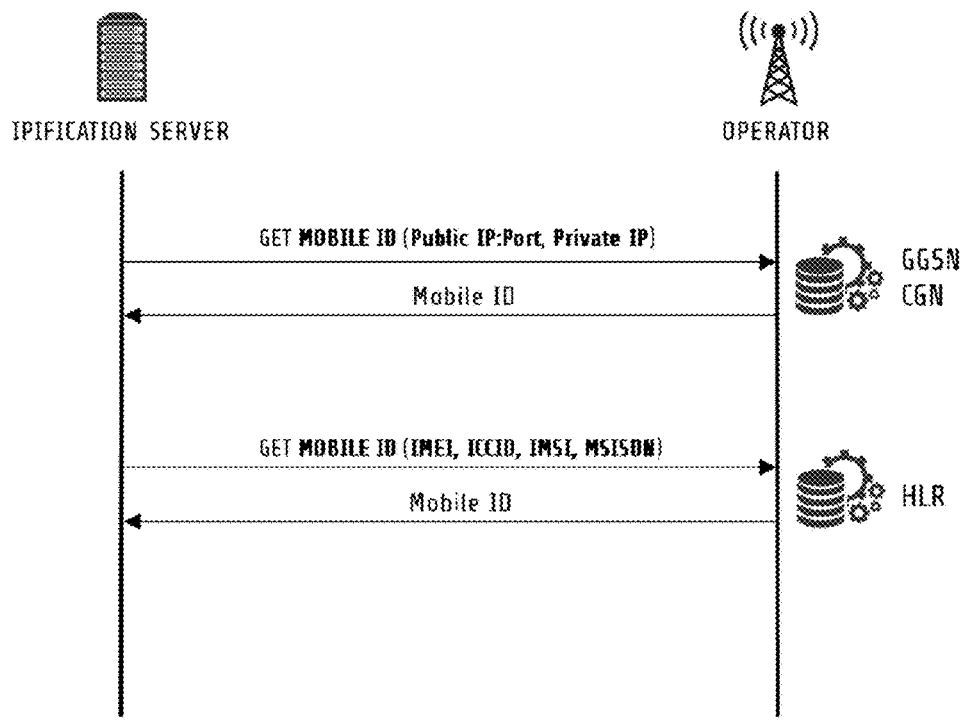
FIG. 1 is a scheme of communication between the IPification server and the Mobile Operator server.

A basic scheme of communication between the IPification server and the Mobile Operator server is presented in FIG. 1. According to this scheme, once the IPification server generates API calls for Mobile ID based on Public IP: Port and/or Private IP parameters, these are transmitted to the Mobile Operator server and processed within the GGSN/CGN component, and the response in form of respective number of Mobile IDs is transmitted back to the IPification server. In case the IPification server generates API calls for Mobile ID based on at least one of the following parameters: IMEI, ICCID, IMSI, MSISDN, such API calls are also transmitted to the Mobile Operator server, but processed within the HLR component, and the response in form of respective number of Mobile IDs is transmitted back to the IPification server.

Figure 2:
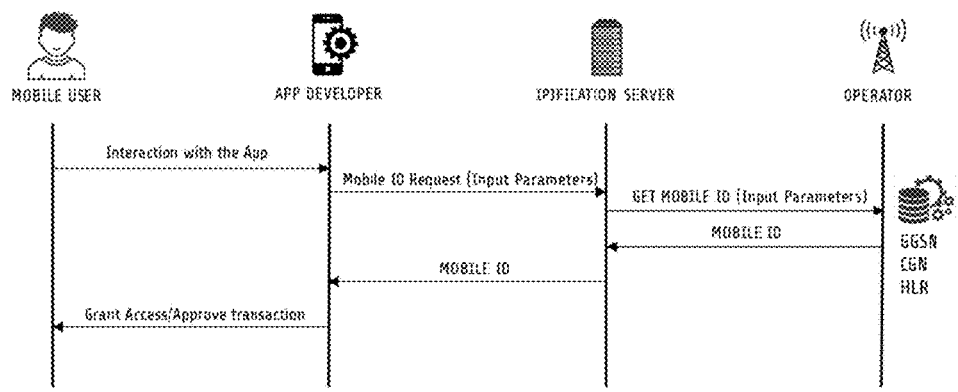
FIG. 2 is a sequence diagram describing communication flow between the mobile user, the application developer, the IPification server and the Mobile Operator server in case of successful user identification.

In FIG. 2 a sequence diagram is provided illustrating communication flow between the mobile user, the application developer the IPification server and the Mobile Operator server in case of successful user identification. The initial step of mobile user's interaction with the specific application triggers the application developer to generate a Mobile ID request based on up to six input parameters (IMSI, IMEI, ICCID, MSISDN, Private IP, Public IP: Port) which is transmitted to the IPification server, which in turn generates up to six API calls (GET MOBILE ID) corresponding to the number of input parameters used in the Mobile ID request. The API calls are transmitted to the Mobile Operator server and processed within assigned components of the Mobile Operator network, including GGSN, CGN and HLR. Resulting Mobile IDs are transmitted back to the IPification server and after successful mobile user identification a respective Mobile ID is sent to the application developer followed by granting the mobile user access to the application/website or approving transaction selected by the user.

Figure 3:
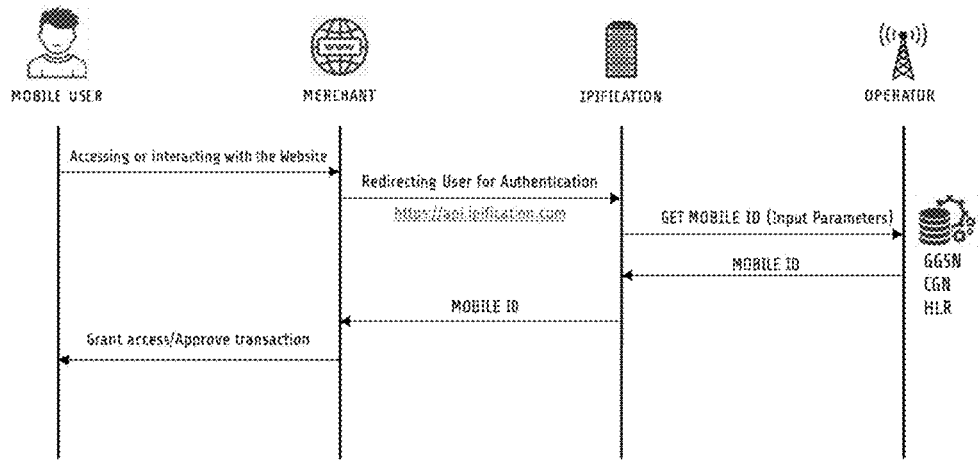
FIG. 3 is a sequence diagram describing communication flow between the mobile user, the website developer, IPification server and the Mobile Operator server in case of successful identification.

The sequence diagram of FIG. 3 illustrating communication flow between the mobile user, the website developer the IPification server and the Mobile Operator server in case of successful user identification is very similar to that of FIG. 2. The only difference is at the initial stage, wherein the mobile user's interaction with the specific website triggers the website developer to redirect the user for authentication to a dedicated website directly connected to the IPification server. In response to the user's authentication request (=Mobile ID request) based on up to six input parameters (IMSI, IMEI, ICCID, MSISDN, Private IP, Public IP: Port) the IPification server generates up to six API calls (GET MOBILE ID) corresponding to the number of input parameters used in the Mobile ID request entered via said dedicated website. Subsequent steps are identical as in the scheme of FIG. 2 described above.

Figure 4:
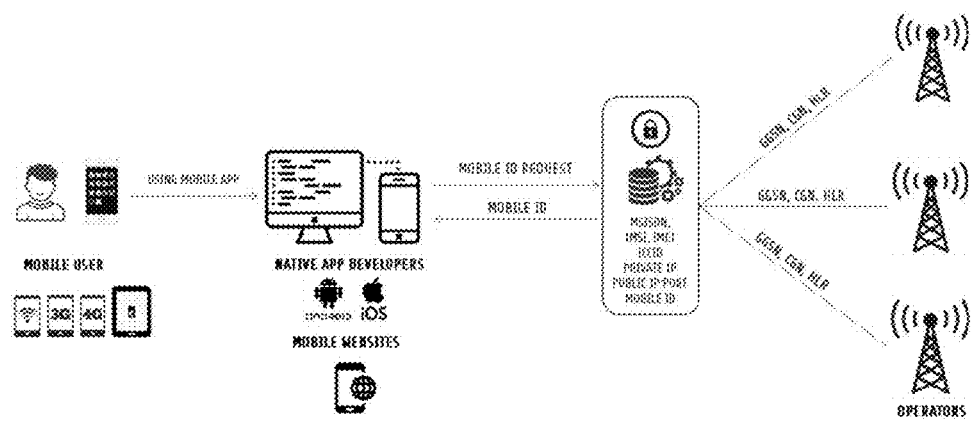
FIG. 4 shows an IPification digital ecosystem.

FIG. 4 illustrates the IPification ecosystem, involving the mobile user, the native application or mobile website developer, the IPification server and Mobile Operator servers. The mobile user initiates the interaction with the native application or attempts to access a website. This triggers the native application or mobile website developer to generate a Mobile ID request transmitted to the IPification server, which in turn communicates with the Mobile Operator servers to obtain the specific Mobile ID based on up to six SIM card and device-related parameters in a method according to the invention already described with respect to FIGS. 2 and 3 above.

Figure 5:
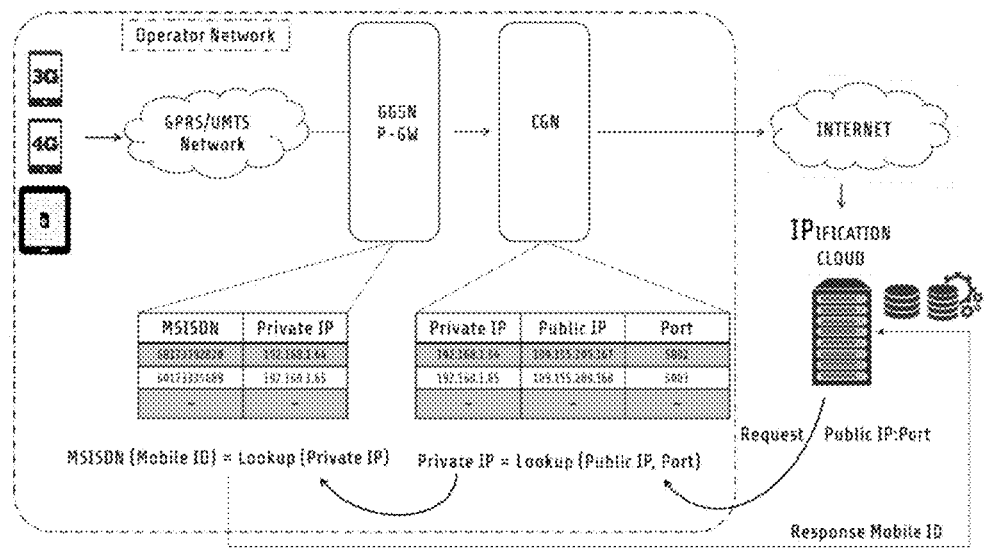
FIG. 5 shows an example of Mobile ID resolution inside the Mobile Operator network when Public IP and Port are received as a Mobile ID query.

FIG. 5 shows an example of Mobile ID resolution inside the Mobile Operator Network when Public IP and Port are received as a Mobile ID query. In this example the Mobile ID is obtained in response to the Mobile ID query based on Public IP:Port by matching the Public IP:Port parameter with a corresponding Private IP parameter in a lookup table within the CGN component, followed by matching the resulting Private IP with a corresponding MSISDN parameter in a lookup table within the GGSN/P-GW, and finally transmitting such obtained MSISDN parameter as the Mobile ID back to the IPification server.

Figure 6:
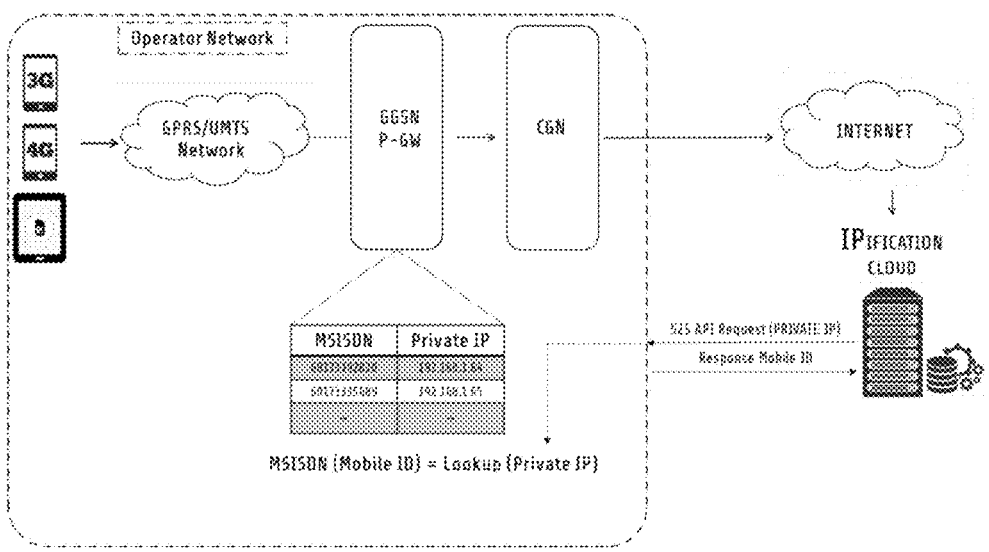
FIG. 6 shows an example of Mobile ID resolution inside the Mobile Operator Network when Private IP address is received as a Mobile ID query.

FIG. 6 shows an example of Mobile ID resolution inside the Mobile Operator Network when Private IP address is received as a Mobile ID query. In this example the Mobile ID is obtained in response to the Mobile ID query based on Private IP by matching the Private IP parameter with a corresponding MSISDN parameter in a lookup table within the GGSN/P-GW component, and transmitting such obtained MSISDN parameter as the Mobile ID back to the IPification server.

Figure 7:
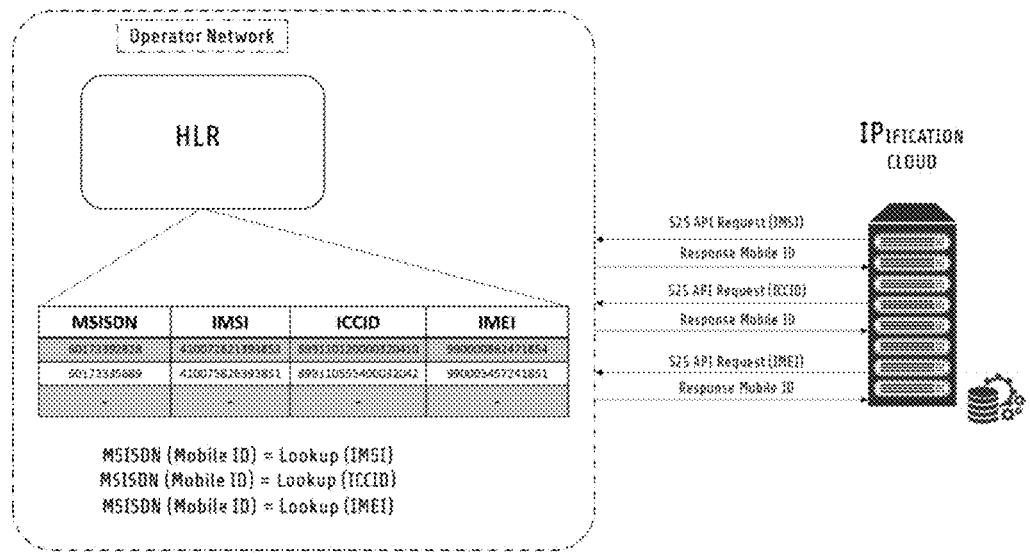
FIG. 7 shows an example of Mobile ID resolution inside the Mobile Operator network when IMSI/IMEI/ICCID are received as Mobile ID queries.
Figure 8:
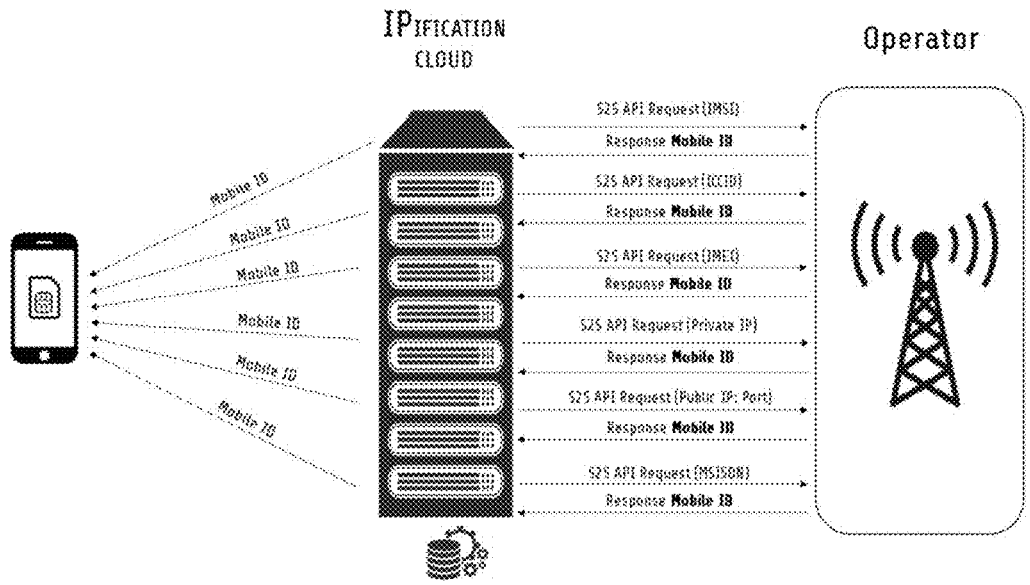
FIG. 8 shows a scheme of decision making process if required number of Mobile IDs are matched.

FIG. 7 shows an example of Mobile ID resolution inside the Mobile Operator Network when IMSI/IMEI/ICCID are received as Mobile ID queries. In this example the Mobile ID is obtained in response to the Mobile ID query based on IMSI, ICCID and/or IMEI parameter by matching each of these parameters with a corresponding MSISDN parameter in a lookup table within the HLR component, and transmitting such obtained MSISDN parameters as Mobile IDs back to the IPification server FIG. 8 shows a scheme of decision making process if required number of Mobile IDs are matched. In this scenario server-to-server (S2S) API requests (i.e. Mobile ID queries) based on up to six input parameters (IMSI, ICCID, IMEI, Private IP, Public IP: Port and MSISDN) are transmitted to the Mobile Operator server and in response a respective number (here: six) of Mobile IDs is generated and transmitted back to the IPification server. As all six Mobile IDs are identical (i.e. have the same value and point to same device/SIM card), the specific mobile user is undoubtedly identified.

Figure 9:
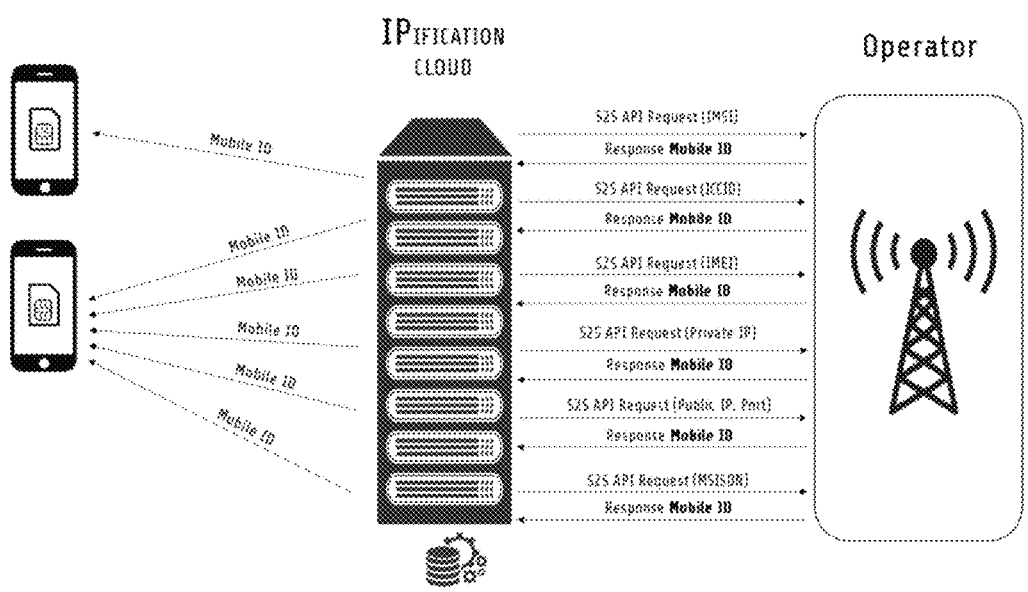
FIG. 9 shows a scheme of decision making process in case not all required Mobile IDs are matched.

FIG. 9 shows a scheme of decision making process in case not all required Mobile IDs are matched. This situation differs from the scenario shown in FIG. 8 in that not all of the six Mobile IDs are identical, i.e. some of them point to a different SIM card/device or at least one of the Mobile IDs is not authenticated at all. As a result, the inability to authenticate specific device/SIM card is undoubtedly concluded.

The invention claimed is:

1. A method of a mobile user identification and authentication based on Subscriber Identity Module (SIM) card or device-related parameters available in a telecommunication network, comprising the following steps:

transmitting a Mobile ID request to an external IPification server from an application or web development platform once the mobile user attempts to interact with the application or access a website;

communicating from the IPification server up to six Mobile ID queries as Application Programing Interface (API) calls to a Mobile Operator server, wherein each of the up to six Mobile ID queries is based on one of the following SIM card or device-related input parameters, comprising: International Mobile Subscriber Identity (IMSI), Integrated Circuit Card Identifier (IC-CID), International Mobile Equipment Identity (IMEI), Mobile Station International Subscriber Directory Number (MSISDN), Private IP address and Public IP address and Port;

communicating a Mobile ID for each of the up to six Mobile ID queries back to the IPification server from the Mobile Operator server, wherein each of the up to six Mobile IDs is generated in response to one of the up to six Mobile ID queries sent to the Mobile Operator server as the SIM card or device-related input parameters, and whereby each of the up to six Mobile IDs is a unique alphanumeric identifier of the mobile user being a subscriber of the mobile communication services provided by the Mobile Operator;

verifying via the IPification server whether all the up to six Mobile IDs obtained from the Mobile Operator server are identical, and depending on the verification result, reacting in two alternative ways:

if the verification result is positive, the IPification server provides the user's single matched Mobile ID to the application or website developer thereby authenticating the mobile user and thus allowing the mobile user to interact with the application or access the website;

if the verification result is negative, the IPification server provides the application/website development platform with information about an unsuccessful authentication of the user, preventing the mobile user from interacting with the application or accessing the website.

2. The method according to claim 1, wherein the communication between the IPification server and the Mobile Operator server uses at least one of the following security mechanisms: Secure Sockets Layer/Hyper Text Transfer Protocol Secure (SSL/HTTPS), Web Services Security-Simple Object Access Protocol (WSS-SOAP), Virtual Private Network (VPN) and Public Key Infrastructure (PKI).

3. The method according to claim 1, further comprising masking the MSISDN and using the masked MSISDN as the SIM card/device related input parameter, wherein the MSISDN is masked using a hashing algorithm, which generates a unique alphanumeric reference of the specific mobile user to be the masked MSISDN.

4. The method according to claim 1, wherein the Mobile Operator network uses at least one of a Home Location Register (HLR), Gateway GPRS Support Node (GGSN)/Packet Data Network Gateway (P-GW) and Carrier-Grade NAT (Network Address Translation) (CGN).

5. The method according to claim 1, wherein the GGSN and the CGN resolve the Private IP address and combination of the Public IP address and Port into at least one of the up to six Mobile IDs, while the HLR is used to resolve IMSI, ICCID, IMEI and MSISDN into at least one of the up to six Mobile IDs.

6. The method according to claim 4, further comprising obtaining at least one of the up to six Mobile IDs in response to at least one of the up to six Mobile ID queries based on the Public IP the and Port by matching the Public IP and Port parameter with a corresponding Private IP parameter in a lookup table within the CGN component, and subsequently matching the resulting Private IP with a corresponding MSISDN parameter in a lookup table within the GGSN/P-GW, and finally transmitting such obtained MSISDN parameter as at least one of the up to six Mobile IDs back to the IPification server.

7. The method according to claim 4, wherein at least one of the up to six Mobile IDs is obtained in response to at least one of the up to six Mobile ID queries, based on Private IP by matching the Private IP parameter with a corresponding MSISDN parameter in a lookup table within the GGSN/P-GW component, and transmitting the obtained MSISDN parameter as at least one of the up to six Mobile IDs back to the IPification server.

8. The method according to claim 4, wherein the at least one of the up to six Mobile IDs is obtained in response to at least one of the up to six Mobile ID queries based on IMSI, ICCID and/or IMEI parameter by matching each of these parameters with a corresponding MSISDN parameter in a lookup table within the HLR component and transmitting the obtained MSISDN parameters as at least one of the up to six Mobile IDs back to the IPification server.

* * * * *